United States Patent [19]
Kuzyk

[11] 3,780,263
[45] Dec. 18, 1973

[54] THERMAL CONTROL APPARATUS

[76] Inventor: Roman Kuzyk, 436 Schiller Ave., Trenton, N.J.

[22] Filed: May 10, 1972

[21] Appl. No.: 252,079

[52] U.S. Cl.................. 219/501, 219/497, 219/505
[51] Int. Cl. ............................................. H05b 1/02
[58] Field of Search.................... 219/327, 328, 497, 219/499, 501, 505, 330, 486

[56]  References Cited
UNITED STATES PATENTS

| | | | |
|---|---|---|---|
| 3,431,399 | 3/1969 | Venning | 219/497 |
| 3,586,829 | 6/1971 | Farmer et al. | 219/497 |
| 3,465,123 | 9/1969 | Harris | 219/328 |
| 3,400,246 | 9/1968 | Zob | 219/328 |
| 3,566,078 | 2/1971 | Krackow | 219/486 |
| 3,569,781 | 3/1971 | Strachan | 317/33 SC |
| 3,708,720 | 1/1973 | Whitney et al. | 317/41 |

Primary Examiner—Bernard A. Gilheany
Assistant Examiner—F. E. Belu
Attorney—I. Michael Bak-Boychuk et al.

[57] ABSTRACT

Thermal control apparatus for controlling the temperature of a photo-developing bath including electrically powered filaments disposed in the bath and energized by a control circuit responsive to the temperature of the bath. The control circuit includes a voltage divider connected across two leads connected to a conventional house outlet having the control point thereof connected to a four layer diode. The output signal from the diode is connected to gate the first of two opposite polarity silicon controlled rectifiers, with the second rectifier being capacitor-connected to gate at the end of the pulse of the first rectifier. The upper leg of the voltage divider includes a positive thermal coefficient resistor thermally coupled to the first rectifier and the lower leg includes a thermistor thermally responsive to the temperature of the bath.

8 Claims, 4 Drawing Figures

PATENTED DEC 18 1973 3,780,263

THERMAL CONTROL APPARATUS

BACKGROUND OF THE INVENTION

The present invention relates to thermal control apparatus and more particularly to electrical control apparatus for controlling the temperature of a photo-developing bath.

In the art of chemical developing of photo-sensitive paper or negatives the quality and clarity of the reproduction is typically related to the chemical accuracy of the developing bath and the accuracy of the temperature thereof. Particularly in the developing of color prints the control over the temperature of the developing bath is critical and many automatically controlled heating devices have been developed in the past to maintain the bath at a preselected constant temperature. Most frequently such devices included electrical heating filaments powered by conventional house current and controlled by various arrangements of thermally sensitive circuits, including devices like thermistors, wherein hardover control was utilized, switching in and out the power to the filament according to the temperature sensed by the control circuit. These techniques often resulted in control errors due to the thermal inertia of the filaments, the control time constants of the system and the volume or heat inertia of the bath, often resulting in an excessive over and under compensation and therefore producing a relatively inaccurate thermal environment for the chemical reaction. Further improvements in the prior art for reducing the above-described errors typically involved extensive circuitry, with the attendant cost and maintenance requirements, precluding convenient utility thereof for home use or use by small development enterprises.

SUMMARY OF THE INVENTION

Accordingly, it is the general purpose and object of the present invention to provide a relatively simple photo-developing bath heater which offers the desired thermal accuracy for high fidelity photo developing.

Other objects of the invention are to provide a photo bath heater which is adapted to conventional home power sources and which also is relatively free of electrical noise.

Briefly these and other objects are accomplished within the present invention by providing a voltage divider connected across two leads extending from a conventional power outlet, where the voltage divider includes a positive thermal coefficient resistor on the upper leg thereof an an adjustable potentiometer connected in series with a negative temperature coefficient thermistor in the lower leg thereof. The thermistor is attached for intimate thermal contact with a photo bath container, registering the temperature thereof in the form of changes in resistance, according to conventional operation of thermistors. Disposed within the container are a plurality of heater filaments, exposed to intimate thermal contact with the developing bath, for transferring heat thereto. The control point, or juncture between the upper and lower legs of the voltage divider is connected to the input side of a four layer diode, generally referred to as a Shockley diode or Silicon Unilateral Switch, which at the output thereof is connected to the gate terminal of a first silicon controlled rectifier. The first rectifier connects the heater filaments with the return lead from the power outlet, conducting when the gate terminal is energized. A second silicon controlled rectifier, reversed in polarity to conduct the opposite half of the current cycle, is capacitively coupled to the first rectifier to conduct the opposite half of the cycle after the first rectifier cuts off. The first silicon controlled rectifier is further thermally coupled with the positive temperature coefficient resistor in the upper leg of the voltage divider whereby the control point triggering the four layer diode is cycled by the temperature output of the first SCR, increasing the proportionality of the control.

DESCRIPTION OF THE PREFERRED EMBODIMENT

Figure 1:
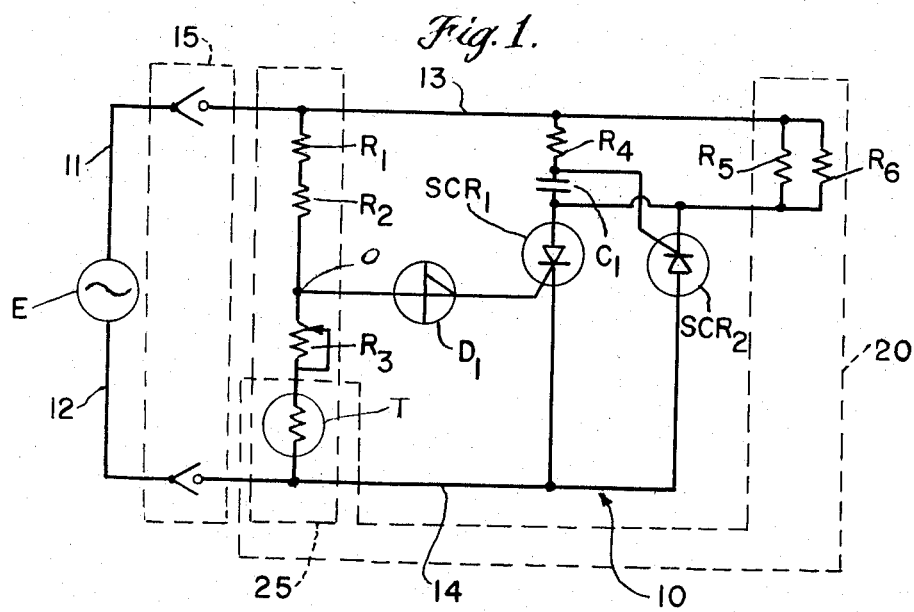
FIG. 1 is a circuit diagram of a first embodiment of a thermistor control switching circuit constructed according to the present invention.

As shown in FIG. 1 a heater circuit 10 is connected by leads 13 and 14 to one side of a conventional two lead receptacle 15 which is connected to a typical home power source E by corresponding leads 11 and 12 extending from the other side thereof. A resistive voltage divider generally designated 25 is connected across leads 13 and 14, comprising a first resistor $R_1$ connected at one end to lead 13, a second positive thermal coefficient resistor $R_2$ connected at the one end thereof to the other end of resistor $R_1$ and an adjustable potentiometer $R_3$ connected at one end to resistor $R_2$ and at the other end to a conventional negative temperature coefficient thermistor T. Thermistor T in turn connects at the other end thereof to the return lead 14 completing the shunt connection of divider 25. Thermistor T is furthermore attached for intimate thermal contact to a photo-bath container 20, responding to the temperature thereof.

The connection between resistor $R_2$ and potentiometer $R_3$ also serves as the control or division point O of divider 25, being also connected to the input terminal of a four layer or Shockley diode $D_1$. Diode $D_1$ characteristically acts as a switching diode changing to a conductive state upon receiving a signal above a preselected voltage level and remaining in the conductive state until the input signal goes to a zero potential, at which time diode $D_1$ resets for the next switching condition. The output terminal of diode $D_1$ is connected to the gate terminal of a first silicon controlled rectifier $SCR_1$, gating the rectifier to conduct following the switching of diode $D_1$ until the voltage across rectifier $SCR_1$ returns to zero. Rectifier $SCR_1$ connects at the input side thereof to respective one ends of heater filaments $R_5$ and $R_6$ extending through photo-bath container 20, which at the other ends thereof connect to lead 13. Thus, when rectifier $SCR_1$ conducts the filaments $R_5$ and $R_6$ are energized, giving off heat and thereby warming any fluid within the container.

In order to further increase the heating capacity of the filaments the gate terminal of a second silicon controlled rectifier $SCR_2$ is capacitor coupled with the input terminal of the first rectifier $SCR_1$. Specifically a capacitor $C_1$ is connected at one end to the input terminal of rectifier $SCR_1$ and at the other end to the gate terminal of rectifier $SCR_2$ and to one end of a resistor $R_4$. Resistor $R_4$ is connected at the other end of lead 13, forming a delay circuit in combination with capacitor $C_1$ for triggering rectifier $SCR_2$ after rectifier $SCR_1$ turns off. Rectifier $SCR_2$ is connected to conduct the negative side of the cycle, thereby conducting current through filaments $R_5$ and $R_6$ for a duration in each cycle determined by the delay of capacitor $C_1$.

Figure 2:
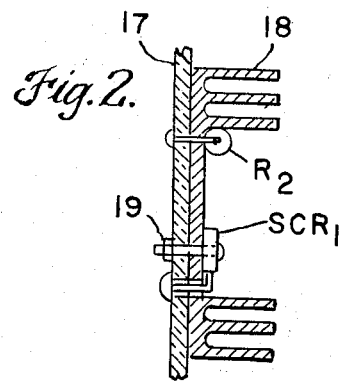
FIG. 2 is an illustration of the mechanical arrangement for thermal connection between R2 and SCR1 of FIG. 1.

As shown in FIG. 2 resistor $R_2$ of the upper leg of voltage divider 25 is mounted in common with the first rectifier $SCR_1$ on a heat sink 18 abutting the underside of a circuit board 17 containing circuit 10. Accordingly, each time rectifier $SCR_1$ is gated to conduct the heat output thereof is conducted by heat sink 18 to resistor $R_2$. Resistor $R_2$ is a positive temperature coefficient resistor, increasing in resistance with an increase in temperature and raising the resistance in the upper leg of divider 25 to lower the voltage at the control point 0 as the temperature of rectifier $SCR_1$ increases. In this manner the voltage at the control point 0 is lowered until it falls below the triggering level of diode $D_1$, at which time rectifier $SCR_1$ no longer triggers, cooling down and lowering the temperature of resistor $R_2$. Thus a secondary loop is formed, thermally pulse modulated, allowing for a more proportioned control as further described herein below.

The description of the operation of the present invention will now be set forth with reference to FIGS. 1 and 2 and with particular reference to FIG. 3.

Figure 3:
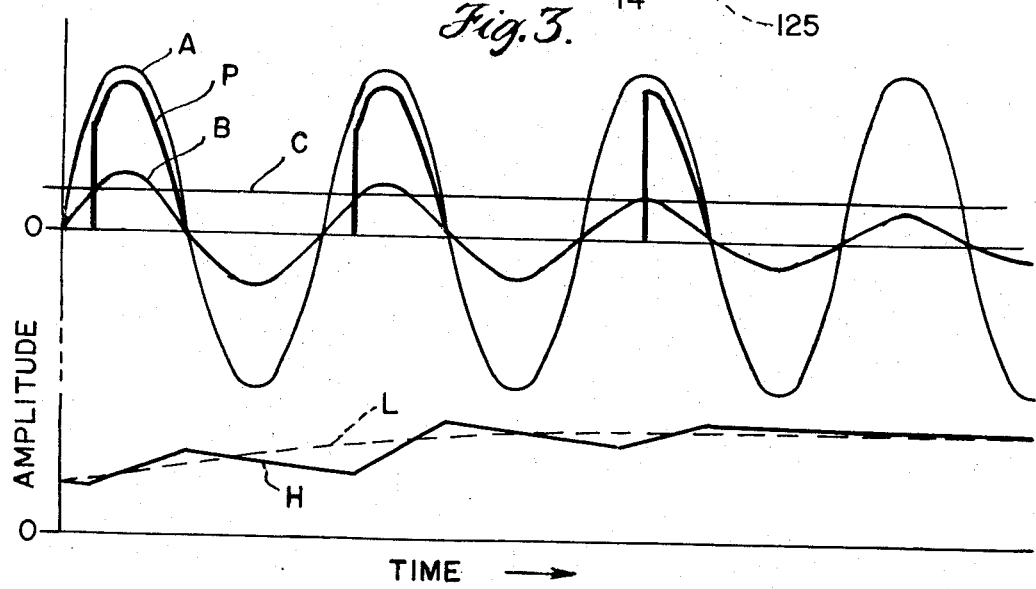
FIG. 3 is a graphical illustration of the electrical and thermal functions at selected points of FIG. 1.

As shown in FIG. 3 the source E generates a sinusoidal signal A, such as is typically available in a conventional wall outlet, of an amplitude of 115 to 120 volts at 60 cycles per second. Voltage divider 25 divides the source voltage A at control point O to form a voltage signal B at an amplitude determined by the ratio of the sum of resistances of resistors $R_1$ and $R_2$ and the sum of the resistances of potentiometer $R_3$ and thermistor T. A voltage level C, corresponding to the triggering voltage of diode $D_1$, is shown referenced against signal B whereby each time voltage B exceeds voltage C diode $D_1$ is triggered, gating rectifier $SCR_1$ until voltage B crosses zero. Rectifier $SCR_1$, in turn, heats up resistor $R_2$ along a temperature curve H, raising the resistance $R_1$ and $R_2$ of the upper leg of the divider 25 and dropping voltage B. As voltage B drops the on-time of $SCR_1$ decreases to turn off the power applied to filaments $R_5$ and $R_6$. Accordingly, as a desired temperature is selected by adjustment of potentiometer $R_3$ the thermal output of filaments $R_5$ and $R_6$ is controlled according to the level of voltage signal B, which is further modified by the combination of the temperature differential L of the bath registered at thermistor T and the temperature of rectifier $SCR_1$ registered by resistor $R_2$.

Figure 4:
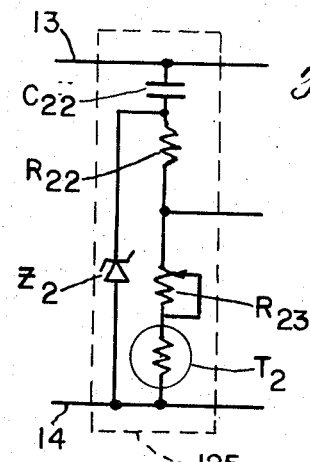
FIG. 4 is yet another embodiment of the structure shown in FIG. 1.

As shown in FIG. 4 yet another embodiment of the circuit 10 includes a voltage divider 125 having a capacitor $C_2$ in the upper leg thereof. Capacitor $C_2$ effectively phase-shifts the voltage at the control point of divider 125 to trigger rectifier $SCR_1$ substantially proximate the positive zero crossing of signal E. In this manner the switching noise of rectifier $SCR_1$ is reduced to a minimum without modifying the basic operation thereof. Furthermore a Zener diode Z is connected across resistor $R_{22}$, potentiometer $R_{23}$ and thermistor $T_2$ of voltage divider 125, stabilizing any variations in line voltage or voltage signal E.

Some of the many advantages of the present invention should now be readily apparent. The invention allows for a relatively large heat transfer capacity through the heating filaments, with the associated heat inertia, at the same time limiting the loop errors thereof. Thus, the initial thermal errors are quickly compensated and the steady state operation of the system is controlled to small overshoots resulting in a constant temperature of the bath.

Obviously, many modifications and variations of the present invention are possible in the light of the above teachings. Accordingly, the invention may be practiced otherwise than as described within the scope of the appended claims.

What is claimed is:

1. A thermal control system for controlling the temperature of a fluid in a container, comprising, in combination:

container means adapted to receive the fluid;
electrical heating means disposed within said container means for transferring heat to the fluid upon passing electrical current therethrough; and
power supply means connected to said electrical heating means including resistive means responsive both to the temperature of the fluid and the internal temperature of said power supply means, gating means operatively connected for switching to said resistive means for conducting a series of continually decreasing pulses of electrical current to said heating means from said power supply means controlled by said gating means to provide a first pulse of a width functionally dependent on the temperature difference between a preselected temperature and the temperature of the fluid and the other consecutive pulses being further functionally dependent in width on the internal temperature of said gating means.

2. A temperature control system according to claim 1 further comprising:

said electrical heating means including a plurality of resistive filaments connected to receive at respective one ends thereof said electrical current and connected at th other ends thereof to return said current.

3. A temperature control system according to claim 2, further comprising:

said power supply means including a source of alternating electrical power, a voltage divider having a resistive upper leg temperature responsive by an increase in resistance with an increase in the temperature, a resistive lower leg including an adjustable potentiometer and a negative temperature coefficient thermistor disposed to sense the temperature of said container means, said upper leg being connected at one end thereof to one side of said power source and said lower leg connecting at the one end thereof to the other side of said power source, the respective other ends of said legs being connected in common, a four layer diode connected at the input terminal thereof to the connection between said upper and lower legs and rectifier means connected to receive the output signal from said diode and disposed to conduct the thermal output thereof to the upper leg of said voltage divider.

4. A thermal control system according to Claim 3, further comprising:

said rectifier means including a first silicon controlled rectifier connected between the other side of said power source and the other ends of said filaments, a second silicon controlled rectifier connected in opposing polarity therewith, said first rectifier being connected at the gate terminal thereof to the output terminal of said diode, and said second rectifier being capacitor coupled at the gate terminal thereof with said first rectifier.

5. A thermal control system according to claim 3, further comprising:

said voltage divider including a capacitor connected in series with the upper leg thereof and a Zener diode connected from said capacitor in parallel across said upper and lower legs.

6. A thermal control system according to claim 5 further comprising:

said rectifier means including a first silicon controlled rectifier connected between the other side of said power source and the other ends of said filaments, a second silicon controlled rectifier connected in opposing polarity therewith, said first rectifier being connected at the gate terminal thereof to the output terminal of said diode, and said second rectifier being capacitor-coupled at the gate terminal thereof with said first rectifier.

7. A thermal control system for controlling the temperature of matter, comprising, in combination:

electrical heating means adapted to be disposed for thermal contact with the matter for transferring heat thereto upon having electrical current passed therethrough; and power supply means connected to said electrical heating means including resistive means responsive both to the temperature of the fluid and the internal temperature of said power supply means, gating means operatively connected for switching to said resistive means for conducting a series of continually decreasing pulses of electrical current to said heating means from said power supply means controlled by said gating means to provide a first pulse of a width functionally dependent on the temperature difference between a preselected temperature and the temperature of the fluid and the other consecutive pulses being further functionally dependent in width on the internal temperature of said gating means.

8. A thermal control apparatus according th claim 7, further comprising:

said power supply means including a source of alternating electrical power, first means connected to receive said electrical power and disposed to sense the temperature of the matter for passing selected pulses of said power to said heating means of a pulse width corresponding to the difference between a preselected temperature and and sensed temperature, and second means operatively connected to said first means for decreasing said pulses upon an increase in the temperature of said first means.

* * * * *